United States Patent [19]

Luck et al.

[11] 4,305,989

[45] * Dec. 15, 1981

[54] PRODUCT CONTAINING HIGH DENSITY SKINS ON A LOW DENSITY CORE AND METHOD OF MANUFACTURING SAME

[75] Inventors: Allan J. Luck, Harvard; John T. Clarke, St. Charles; Michael R. Hoffman, Elgin, all of Ill.

[73] Assignee: Masonite Corporation, Chicago, Ill.

[*] Notice: The portion of the term of this patent subsequent to Nov. 20, 1996, has been disclaimed.

[21] Appl. No.: 95,630

[22] Filed: Nov. 19, 1979

Related U.S. Application Data

[63] Continuation-in-part of Ser. No. 881,184, Feb. 27, 1978, Pat. No. 4,175,148, which is a continuation-in-part of Ser. No. 739,184, Nov. 5, 1976, Pat. No. 4,175,150.

[51] Int. Cl.³ .............................................. B32B 5/14
[52] U.S. Cl. .................................... 428/171; 264/120; 264/113
[58] Field of Search ................. 264/113, 120; 428/171

[56] References Cited

U.S. PATENT DOCUMENTS 4,175,148 11/1979 Luck et al. ........................ 428/171
4,175,150 11/1979 Luck et al. ........................ 428/171

Primary Examiner—James R. Hall
Attorney, Agent, or Firm—Mason, Kolehmainen, Rathburn & Wyss

[57] ABSTRACT

A fiberboard is manufactured having relatively high density skins on a relatively low density core by including a skin forming chemical in at least the surface fibers of a consolidated mat, having a density of less than 35 pounds per cubic foot, and then hot-pressing the consolidated mat at a temperature of at least 525° F. to form a board having high density surface skins. In accordance with another embodiment of the present invention, a skin forming chemical is used to form a skin on higher density mats having a density of 35 pounds/ft.³ or greater. The skin formed on the higher density mats has strength and density properties which are not as significantly different from the core material as is the skin formed over the low density core material of the first embodiment, but the skin on the higher density mats also improves the board strength, stiffness paint holdout and design fidelity properties.

21 Claims, 1 Drawing Figure

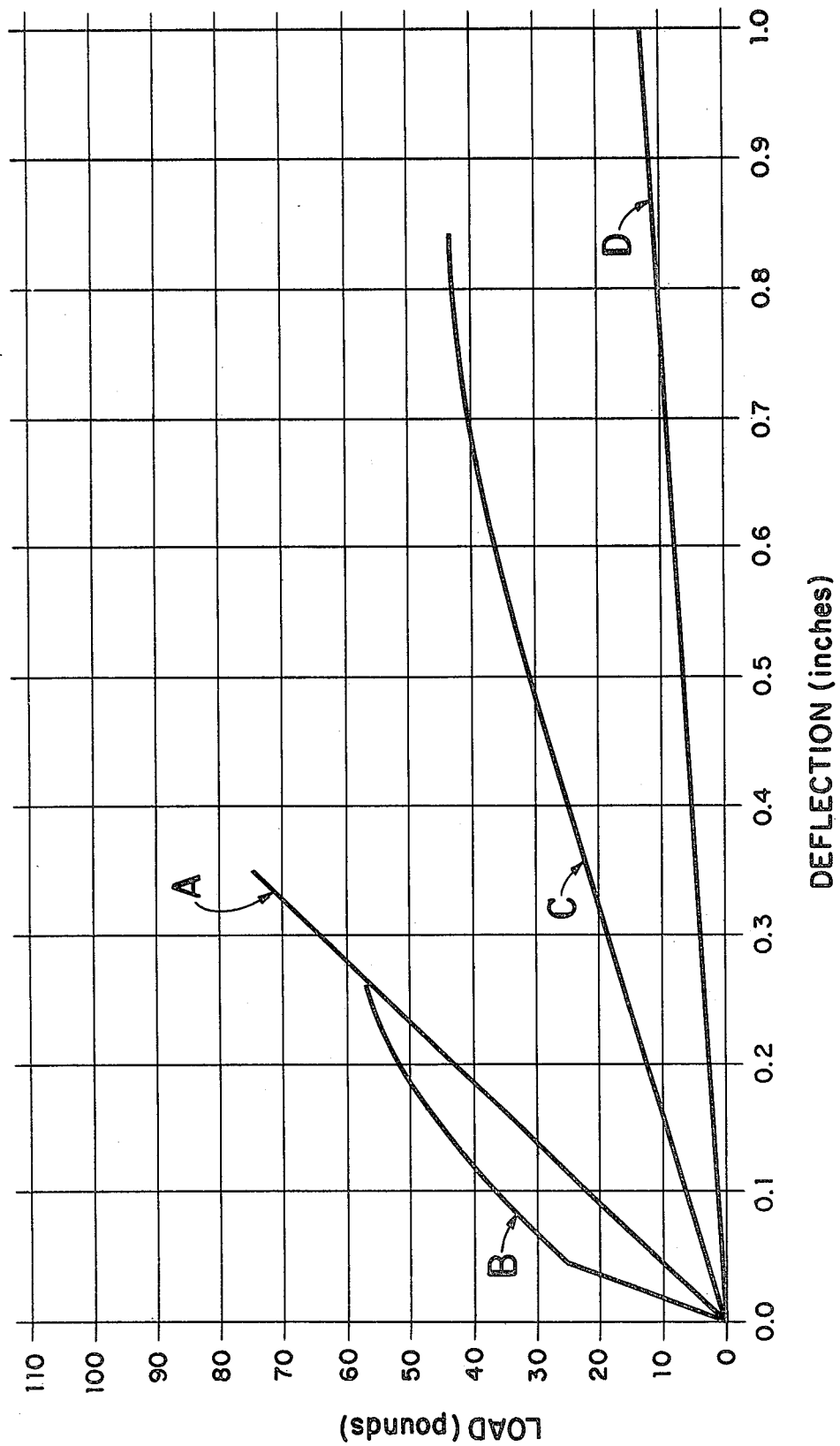

PRODUCT CONTAINING HIGH DENSITY SKINS ON A LOW DENSITY CORE AND METHOD OF MANUFACTURING SAME

CROSS REFERENCE TO RELATED APPLICATION

This application is a continuation-in-part of our prior application Ser. No. 881,184 filed Feb. 27, 1978, now U.S. Pat. No. 4,175,148 which is a continuation-in-part of our prior application Ser. No. 739,184, filed Nov. 5, 1976; now U.S. Pat. No. 4,175,150.

FIELD OF THE INVENTION

In accordance with one embodiment of the present invention, the invention relates to a fiberboard panel having a relatively low density core or central portion and having relatively high density skins or surface portions. In accordance with another embodiment of the present invention, a consolidated mat having a density of 35 pounds/ft.$^3$ or greater is provided with a high density skin to improve the surface properties of strength, stiffness, paint holdout and design fidelity. The skin formed has a density of about 40–55 pounds/ft.$^3$ and, therefore, may or may not be more dense than the core material. More particularly, the present invention relates to a man-made board having high density skins or surface portions as an integral surface part of a fiberboard or particle board panel or panel portion wherein the high density skins are produced by contacting the surface fibers of a consolidated board with a skin forming chemical, and thereafter hot-pressing the board in a post-press or second pressing operation at a temperature of at least 525° F. to form smooth, stiff, hard, dense skins on the surface fibers contacted with the skin forming chemical.

BACKGROUND OF THE INVENTION

The process of the present invention relates to a "post-press" or second press operation for creating thick, hard, integral surface portions on at least one and preferably both surfaces of a man-made fiberboard or particle board substrate. A handleable mat is first manufactured by consolidating a cellulosic fiber-containing composition to form a consolidated fiberboard or particle board. The handleable mat can be consolidated by drying a mat formed by depositing a water slurry of fibers onto a water pervious support member, as is common in the manufacture of insulation board, or the mat can be consolidated under heat and pressure until substantially dry in a first press operation. This consolidated mat is thereafter "post-pressed" to form a surface skin to improve the stiffness, strength, paint holdout and design fidelity properties of the board. In accordance with one embodiment disclosed in our prior U.S. Pat. No. 4,175,148 a low density core material of less than 35 pounds/ft.$^3$ is maintained and a skin, formed in the after consolidation press step with the skin forming chemical, is a higher density surface portion. In accordance with a second embodiment disclosed herein, heavier skinned surface products are formed in the same manner but starting with higher density consolidated mats on the order of 35 pounds/ft.$^3$ or greater, for example, 35–65 pounds/ft.$^3$. For the purpose of the present invention, a "post-press" operation refers to a press step performed on the mat after consolidation thereof.

The fiberboard of the present invention is generally formed in two separate operations. The first operation forms a condolidated mat while the second or "post-press" operation creates the skinned surface portions. It should be noted however, that consolidated man-made boards previously manufactured are readily available and can be used as the consolidated mat to impart a skin to such consolidated mats in accordance with the present invention. It is quite surprising that a "post-press" or second pressing operation on a consolidated mat surface treated with a particular skin forming chemical is effective in forming a smooth surface skin on the mat. Prior to the present invention, it was thought that the qualities and physical characteristics of a board would be finally determined by the conditions under which the board is initially consolidated and by the raw materials used to form the board, because of the bonding occuring during consolidation.

Much of the bonding necessary for cohesion and strength in a man-made board occurs during the consolidation of the board during hot-pressing. Prior to drying a board made by the wet process, the board is weak, but the bonding forces created during the final consolidation are generally quite powerful. Generally the same bonding effect occurs in the final consolidation of a board made by the dry process. Prior to hot-pressing, the loosely disassociated cellulosic fibrous product is quite weak, but after hot-pressing the mat into its final configuration, it is very powerfully held together by the bonding which occurs during hot-pressing. Hot-pressing during consolidation causes a welding or coalescing of the cellulose fibers at the surface of the product so that the surface portion consists of wood remade in modified form. It is very difficult to densify or restructure the surface of a consolidated product without again destroying these fiber-to-fiber surface welds. It is especially difficult to densify only a surface portion of a consolidated board in an amount sufficient to substantially increase the strength and stiffness of the product while retaining the lightweight core material to provide a lightweight product. This same concept can be used to improve and restructure the surface of higher density core materials by post-pressing consolidated mats having a density of 35 pounds/ft.$^3$ or greater. The process described herein accomplishes these results.

A prior patent, assigned to Masonite, U.S. Pat. No. 4,007,076, discloses and claims a method of post-press embossing consolidated, man-made boards to effectively and accurately reshape the surface of a completed panel without surface defects such as surface fiber tearing. In accordance with U.S. Pat. No. 4,007,076, a previously consolidated panel is post-press embossed at a pressure of at least 1000 psi to create a surface design, or to permanently redesign the surface of a consolidated product without destroying the interfiber bonding established at the surface of the board during consolidation. The product thus formed does not include a skin formed by post-pressing with a skin forming chemical and does not disclose retaining a relatively low density core or central portion in accordance with one embodiment of the present invention.

In accordance with the present invention, it has been found that the surface physical characteristics of a consolidated mat can be altered in a post-press operation to harden, smooth, and densify the surfaces thereof when at least the surface fibers of the mat are contacted with a skin forming chemical. During the post-press operation, at a temperature of at least 525° F., the skin forming chemical reacts to stiffen and strengthen the cellulosic substrate, such as insulation board and fiberboard, to provide the necessary strength for the intended purpose of the substrate while, in one embodiment, retaining a relatively low density, lightweight central core of the material and in another embodiment, using a consolidated mat of at least 35 pounds/ft.$^3$ density, improving the stiffness, strength and surface properties of paint holdout and design fidelity.

SUMMARY OF THE INVENTION

An object of the present invention is to provide a lightweight fiberboard or particle board panel having hard, dense surface skins thereon.

Another object of the present invention is to provide a cellulosic fiber-containing article having a hard, dense smooth skin on at least one surface thereof.

Another object of the present invention is to provide a lightweight fiberboard, having a central core of material with a density in the range of 10-35 pounds/ft.$^3$, having strength and stiffness properties equivalent or better than hardboard having a density in the range of 45-65 pounds/ft.$^3$ Another object of the present invention is to create a skinned surface on a consolidated mat having a density of at least 35 pounds/ft.$^3$, for example 35-65 pounds/ft.$^3$, to create a relatively dense fiberboard or particle board having excellent strength, stiffness, paint holdout and design fidelity properties.

Another object of the present invention is to provide a lightweight man-made board having design-fidelity and paint hold-out properties equal to or better than hardboards manufactured in accordance with existing technology.

Another object of the present invention is to provide a method of providing an integral, structural skin on one or more surfaces of a cellulosic fiber-containing consolidated product by including a skin forming chemical within at least the surface fibers of the consolidated product, and, thereafter, post-pressing the chemically treated consolidated board in an after consolidation or post-pressing operation at a temperature of at least 525° F.

In accordance with an important feature of the present invention, it has been found that particular chemicals will provide hard, dense surface skins to a consolidated handleable mat when the surface fibers are contacted therewith and the mat is thereafter "post-pressed" at a temperature of at least 525° F.

In accordance with another important feature of the present invention, the technology disclosed herein has been developed to provide a low density, strong cellulosic fiber-containing product, for example, fiberboard which has sufficient strength for end uses such as well panelling, siding, and moldings. The low density, high strength product is produced by first manufacturing or otherwise obtaining a low density consolidated fiberboard or particle board substrate having strength sufficient to be handled in manufacture, including a skin forming chemical in at least the surface fibers of the substrate and thereafter post-pressing the substrate to develop dense outer layers of skins on the exterior surfaces.

In accordance with another important feature of the present invention, a higher density consolidated mat having a density of at least 35 pounds/ft.$^3$ is provided with a skin, defined as a composition formed by hot-pressing a consolidated cellulosic fiberboard or cellulosic particle board containing a skin forming chemical in at least the surface being hot-pressed, at a temperature of at least 525° F. Such hot pressing of consolidated mats containing particular skin forming chemicals creates a smooth skin having a density in the range of about 40 to about 55 pounds/ft.$^3$ and is formed in a thickness of about 1 to about 7 mils.

Surprisingly, it has been found that the skin created by post-pressing a low density consolidated product having a skin forming chemical in at least the outer surface fibers thereof creates a hard, dense surface which, if desired, effectively and permanently reproduces embossing plate details on the surface of the product and creates a smooth outer surface having excellent holdout of coating materials, such as paint. The post-pressing operation restructures the surface fibers contacted with the skin forming chemical to provide exceptional strength and stiffness properties to a lightweight panel. The panel manufactured in accordance with the present invention form a relatively lightweight consolidated mat having a density of less than 35 pounds/ft.$^3$ compares in material costs, and physical properties, such as breaking load and stiffness, to one-quarter inch hardboard panelling having a density of about 60 pounds/ft.$^3$. One-quarter inch hardboard was used as the control to determine the viability of producing the low density product of the present invention having high density, high strength skins as surface layers.

DETAILED DESCRIPTION OF THE INVENTION

Consolidated Mat

In accordance with one embodiment of the present invention, a high strength fiberboard product is manufactured having hard, dense skins or surface portions thereon over a relatively low density core material. A low density consolidated mat having a density less than about 35 pounds/ft.$^3$, i.e. 10-35 pounds/ft.$^3$, is manufactured using either the wet or dry process as known in the manufacture of man-made boards. The low density consolidated mat is then post-pressed at a temperature of at least 525° F. after first treating at least the surface fibers of the mat with a skin forming chemical to form a skin on the surfaces of the product.

The method of producing a consolidated mat is well known as presently used in producing man-made boards such as hardboard, chipboard, particle board, panelboard, acoustical board, insulation board, and the like. In the wet process, the raw material is uniformly blended in a head box with copious quantities of water to form a slurry. The slurry is deposited onto a water-pervious support member, generally a Fourdrinier wire, where much of the water is removed leaving a wet mat of cellulosic material. The wet mat is then dryed to consolidate, as in the manufacture of insulation board, or can be transferred from the pervious support member and consolidated under heat and pressure to form the board. Typically, pressures of from 400 to 500 psi and temperatures up to about 400° F. are encountered in hot-press consolidation of a man-made board manufactured by the wet process. The dry process is similar to the wet process except that the cellulosic fibers are first coated with a thermosetting resin binder, such as a phenol-formaldehyde resin, and are then randomly distributed into a mat by air blowing the resin-coated fibers onto a support member. In the dry process, the mat is pressed at temperatures up to about 450° F. and pressures less than about 1000 psi to cure the thermosetting resin and to compress the mat into an integral consolidated structure.

The lightweight handleable mat on which a skin is formed in accordance with one embodiment of the present invention is manufactured in a conventional manner, using conventional cellulosic fiber stock. To achieve a lightweight product having strong, stiff, more dense skin surfaces, the handleable mat should have a density, after consolidation, in the range of about 10-35 pounds per cubic foot, preferably in the range of 15-30 pounds/cubic foot. Panels of varying thicknesses having densities within this range can be produced in accordance with known technology to provide lightweight core materials on which a surface skin can be developed in accordance with one embodiment of the present invention.

Handleable mats have been produced having a density as low as ten pounds per cubic foot and a thickness of one and one-half inches. Mats having densities as low as ten pounds per cubic foot are useful as the handleable mat in producing lightweight products in accordance with the principles of the present invention, any low density mat (less than 35 pounds per cubic foot) is considered to be handleable if it can survive the trimming, cutting, stacking, packing, shipping, and unloading operations necessary to produce fiberboard. All such handleable mats are useful in accordance with the principles of the present invention.

In accordance with a second embodiment of the present invention, heavier fiberboard or particle board consolidated mats having densities of at least 35 pounds/ft.$^3$, i.e. 35-65 pounds/ft.$^3$ can be provided with a surface skin, although the surface skin may or may not be more demse than the cellulosic material on which the skin is formed, particularly for fiberboard or particle board consolidated mats having a density of 40 pounds/ft.$^3$ or more. The heavier fiberboard or particle board consolidated mats also are manufactured in a conventional manner using conventional cellulosic fiber stock. Fiberboard or particle board consolidated panels having a density of 35-65 pounds/ft.$^3$ can be produced in accordance with known technology and a skin forming chemical included in at least the surface fibers either before of after consolidation. The consolidated mat containing the skin forming chemical then is post-pressed at a temperature of at least 525° F. to form a smooth surface skin of unknown composition.

Skin Development

The consolidated mat containing a skin forming chemical is pressed in a post-pressing operation at a temperature of at least 525° F. to develop a surface layer herein called a "skin", defined as an outer layer having a different composition than a thickness of cellulosic material over which it is formed. It was found in early investigations that heat and pressure alone would not form a thick skin on the surface of a low density panel. The skin thickness is not as readily apparent on the surface of higher density panels because its properties, while different than the cellulosic layer thereunder, are not significantly visibly different since the density of skin and underlayer may be approximately equal. However, the skin certainly forms as a result of the high temperature post-pressing with a skin forming chemical and the skin on higher density panels significantly improves the paint holdout and design fidelity properties of the board. Table I shows that post-pressing alone, without pre-treatment with a particular skin forming chemical, does not produce a skin.

The table also shows that the sample post-pressed with a skin forming chemical had a higher breaking load and a higher stiffness than the unpressed fiberboard sample by 82%. These property improvements occured even though the post-pressed sample was thinner. Normally it would be expected that the thicker product would have the higher stiffness and breaking load values.

TABLE I

Effect of Heat Pressure and Post-Pressing On Skin Development

| Substrate | Final Caliper (In.) | Density lb/ft$^3$ | Skin Thickness (In.) | Stiffness lb/in. | Breaking Load* lb. |
|---|---|---|---|---|---|
| fiberboard not post-pressed | 0.563 | 17 | 0 | 103 | 24 |
| post-pressed fiberboard (no urea) | 0.406 | 22 | 0 | 68 | 20 |
| fiberboard (w/urea and post-pressed at 550° F.) | 0.406 | 22 | 0.030 | 188 | 35 |

*The stiffness and breaking load data as set forth throughout this disclosure, were obtained by breaking 3" × 12" samples over a 10" span. A load was applied to the center of the span and the center of the sample was deflected at a constant rate. As the sample was deflected, the force (load) exerted on the sample was recorded. As the sample is bent, the force is continuously increased until the sample breaks. A load/deflection curve can be obtained for the tested samples, as set forth in the drawing. During the initial phases of loading, the force applied is a linear function of the deflection. The term "stiffness", as used throughout this disclosure, is the slope (lb/in.) of this linear portion of the load deflection curve. The term "breaking load", as used throughout this disclosure, is the maximum load point obtained on the load/deflection curve before the sample breaks.

Various chemicals were evaluated on the surface of low density mats to determine which chemicals provide a high density skin on the surface of a mat when the chemically treated, consolidated mat is "post-consolidation" hot-pressed at a temperature of at least 525° F. The following chemicals set forth in Table II provide a high density skin of at least 0.020 inch thickness on the surface of a consolidated mat when the consolidated mat, containing the chemical, is hot-pressed at a temperature in the range of 525°-650° F.:

TABLE II

LOW DENSITY, STRESSED-SKIN SKIN PRODUCERS

| CHEMICAL | SKIN THICKNESS | APPLICATION RATE* (lbs per thousand square feet) |
|---|---|---|
| Ammonium Thiocyanate (Strong Sulfur Odor) | .030 | 170 |
| Thiourea (Strong Sulfur Odor) | .030 | 85 |
| Acetamide | .020 | 140 |
| Dicyandiamide | .030 | 140 |
| Ethanolamine | .035 | 195 |
| Hexamethylenetetramine | .030 | 100 |
| Hydrazine + Formaldehyde in a 1/1 weight ratio | .020 | 90 |
| Ammonium Xylene Sulfonate | .020 | 150 |
| Mono-Ammonium Phosphate | .030 | 100 |
| Di-Ammonium Phosphate | .030 | 100 |
| Ammonium Sulfate | .025 | 100 |
| MASONEX** (Trademark of Masonite Corporation) | .030 | 150 |
| Sucrose | .025 | 100 |
| Boric Acid/Borax in a 1/1 weight ratio | .030 | 150 |
| Linseed Oil + Iron Tallate | .035 | 75 |

TABLE II-continued
LOW DENSITY, STRESSED-SKIN SKIN PRODUCERS
(2% by weight of oil)

*The application rate has no bearing upon the minimum amount of chemical necessary to form an adequate skin.
**MASONEX (Trademark of Masonite Corporation) is a hemicellulose extract derived from wood by steam explosion treatment (digestion) of wood chips without chemical addition and contains the following components:

| | | | |
|---|---|---|---|
| Protein | .5% | Simple Sugars (after hydrolysis) | 35.0% |
| Fat | .5% | Distribution of Sugars** (after hydrolysis) | |
| Fiber | 1.0% | Glucose | 14.0% |
| Ash | 6.0% | Mannose | 27.0% |
| Solids | 60.0% | | |
| Calcium | .5% | Galactose | 8.0% |
| Phosphoros | .07% | Arabinose | 5.0% |
| Metabolizable | | Xylose | 46.0% |
| Energy (ruminants) | | pH | 5.0 |
| 890 | | | |
| Simple Sugars** | 10.0% | Carbohydrates | 55.0% |

**The sugars, both before and after carbohydrate hydrolysis, cause skin formation.

Mixtures of any two or more of the chemicals listed in Table II can also be used as the skin forming chemical in accordance with the principles of the present invention.

The following group of chemicals taken from Table II provide stronger skins when a consolidated low density mat is post-pressed in accordance with the present invention: ammonium thiocyanate, thiourea, dicyandiamide, hexamethylenetetramine, MASONEX (Trademark of Masonite Corporation), sucrose and mixtures thereof. Derivatives of urea such as guanamine, alkylureas (i.e. methylurea, ethylurea), lower alkylthioureas, methylolurea, biuret, inorganic acid salts of urea, and mixtures thereof are useful in forming skins. The remainder of the chemicals listed in Table II and mixtures thereof form weaker skins.

The chemicals listed in Table III were evaluated and found not to develop skins on the surface of low density consolidated mats when "post-consolidation" pressed at a temperature of at least 525° F.:

TABLE III
Low Density, Stressed-Skin Non-Skin Producers

Chemical

Ammonium Chloride
Ammonium Hydroxide
Dimethylol Urea
Aluminum Sulfate
Zinc Chloride (Hygroscopic)
Sodium Carbonate
Potassium Dichromate
Sodium Nitrate
Aniline
Melamine
Butylamine
Glycerin
Resorcinol
Formamide
Formic Acid
Ammonium Acetate
Raw Linseed Oil Without Dryer
Quaternary Ammonium Silicate
Starch
Hydrochloric Acid
Nitric Acid
Phosphoric Acid In attempting to achieve thicker surface skins on the consolidated mat during post-pressing it was found that the skin forming chemical should deeply penetrate the surface fibers of the handleable mat prior to post-pressing. Surface spraying therefore led to the impregnation method of incorporating the chemical into the handleable mat.

IMPREGNATION PROCESS

It has been found that when the skin forming chemicals are impregnated into the surface of a consolidated mat having a density in the range of 10-65 pounds/ft.$^3$ after initial consolidation of that mat, a much thicker skin can be produced by vacuum impregnating the skin forming chemical to provide a skin thickness in the range of 0.060 to 0.070 inch.

In testing various degrees of skin forming chemical penetration by vacuum impregnating the mat after initial consolidation, it was found that increasing the depth of skin forming chemical penetration beyond that required to produce 0.060 inch skins, for example, at a level of 111 pounds/thousand square feet, does not improve the physical properties of the panel, nor does it increase the skin thickness beyond 0.070 inches.

In accordance with the results achieved as set forth in Table III, each material was applied to the surface of a 20 pounds/cubic foot handleable mat at an equivalent cost level and a vacuum box was utilized on the under surface of the mat to insure deep penetration of the impregnant.

Platen Temperature . . . 550° F. (Both Sides)
Closing Speed . . . Fast as Possible
Holding Time at Caliper . . . 30 Seconds
Compress . . . 0.100 inch
Pressure . . . 200 p.s.i.
Opening Speed . . . Fast as Possible The skin forming chemical can be included in overlay fibers in manufacturing the handleable mat. For example, a handleable mat can be produced by dry forming the mat in three layers from three separate head boxes with the skin forming chemical blended into the two surface layers, and consolidating to produce a handleable mat having the skin forming chemical in two distinct surface layers but not in the central core. The amount of chemical blended into the overlay or surface layers regardless of the method of manufacture should be at least 5% by dry weight of surface layer contacted with the chemical, and preferably in the range of 10-15% by dry weight of surface layer contacted. Resin binders in the surface layers can be reduced to about one half the normal amount (i.e. about 4%) since post-consolidation hot-pressing at a temperature of at least 525° F. substantially increases the strength of the surface layers.

To provide for better surface smoothness and paint holdout, a consolidated mat produced as described by the overlay process can be surface treated with the skin forming chemical in an amount of about 5-15 pounds of skin forming chemical per thousand square feet by spraying an aqueous solution of the chemical onto the surface of the mat just prior to post-pressing.

In addition to being stiffer and stronger than hardboard having a much greater density, the boards having skins produced in accordance with the present invention are superior with respect to hardness, embossing fidelity, and paint holdout. "Design fidelity" or simply "fidelity" as used herein is a measure of the accuracy of reproduction of the design of an embossing plate onto the surface of a consolidated mat. The panel produced by post-pressing the lower density (i.e. 35 pounds/ft.$^3$) consolidated mats in accordance with the present invention can be embossed with deeper embossing patterns because of the lower density. "Paint holdout" is the ability of a panel to keep paint on its surface without a significant amount striking into the panel.

The amount of pressure used in post-pressing should generally not go beyond 300 p.s.i. for the low density (i.e. 35 pounds/ft.$^3$) panels so that a relatively low density core or central portion of the board can be maintained. Higher pressure can be used when the initial consolidated mat has a density of at least 35 pounds/ft.$^3$, or where higher density end products are desired. Some caliper reduction must result during post-pressing to apply both heat and pressure necessary for thick skin development. Contact (unregistrable) pressure is sufficient for slight caliper reduction. It has been found that as the fibers are compressed during the post-pressing operation, the density increased in the overlay layers and, to some extent, in the core material. Thereafter, the core begins to resist compression. Accordingly, the face or overlay layers will compress more than the core.

POST-PRESS CONDITIONS

The consolidated mat having a density of less than 35 pounds per cubic foot is "post-pressed" at a temperature of at least 525° F. To achieve the full advantage of the present invention, the temperature of "post-pressing" should not exceed 650° F. It is preferred to "post-press" at a temperature in the range of 525°–575° F. After chemical impregnation, the consolidated mat is generally dried to about 10% or less moisture prior to post-pressing.

To maintain a relatively low density core material in the fiberboard product, in accordance with one embodiment of the present invention, the pressure used in "post-pressing" should not exceed about 300 p.s.i. Pressures can vary depending upon the density of the handleable mat—with lower density mats (i.e. 10–20 pounds per cubic foot) it is preferred to use pressures on the order of 30–150 p.s.i. in post-pressing. With densities of 20 to less than 35 pounds/ft.$^3$ it is preferred to use a "post-press" pressure less than 200 p.s.i. With higher density mats of 35 pounds/ft.$^3$ or greater there is no maximum pressure in post pressing; the pressure is selected for the desired final density of the skinned board. The time of post-pressing is not critical and preferably is in the range of 5–60 seconds. With higher temperatures in the range of 575°–650° F., it is desirable to remove the product from the post-press operation within about 10 seconds to avoid charring or decomposition of the surface skins.

AMOUNT OF SKIN FORMING CHEMICAL

The amount of skin forming chemical necessary to form a sufficient skin thickness for the purpose of the present invention generally is at least about 5% by weight of the fibers contacted. Amounts vary depending upon the particular chemical, as set forth in Table II, to provide a relatively thick skin. The weight percent of skin forming chemical needed is at least 5% based upon the dry weight of the surface material in which the chemical has penetrated when combined by the impregnation process. When combined by the overlay process, the weight percent of skin forming chemical needed is at least 5% based upon the dry weight of overlay material.

To achieve the full advantage of the present invention, the amount of skin forming chemical incorporated into the handleable mat should be in the range of 6–20% based on the dry weight of the material contacted therewith, and preferably in the range of 9–17% by weight.

The product formed by the process of the present invention includes a hard, dense, smooth skin having a different composition than the composition of the consolidated mat on which the skin is formed. The composition of the skins has not been determined by analysis. The base layer or core material underlying the skin can have any desired, i.e. 10–65 pounds per cubic foot, so that, in one embodiment, products of varying density can be manufactured having hard skins thereon.

Although the present invention is described in terms of particular constituents, and ranges thereof, and manner of making and using the same, it is recognized that departures may be made therefrom within the scope of the invention as defined in the appended claims.

We claim:

1. A method of manufacturing a cellulosic fiber containing board having a skin on at least one surface thereof cmprising:
   (a) compressing a fibrous composition, including cellulosic fibers, under heat and pressure to form a consolidated mat;
   (b) applying to at least one surface of said mat a solution of a skin forming chemical in an amount of 5–20% based on the dry weight of said surface layers wherein said skin forming chemical is selected from the group consisting of ammonium thiocyanate, thiourea, acetamide, dicyandiamide, ethanolamine, hexamethylenetetramine, hydrazine+formaldehyde, ammonium xylene sulfonate, mono-ammonium phosphate, diammonium phosphate, ammonium sulfate, MASONEX, sucrose, boric acid+borax, linseed oil+iron tallate, and mixtures thereof; and
   (c) hot-pressing said consolidated mat containing said skin forming chemical in at least its surface fibers, at a temperature of at least 525° F. to form a board having a skin on at least one surface thereof, said skin defined by a thickness of material on said surface of said board having a different composition than the material on which the skin is formed and having a density of 40–55 pounds/ft.$^3$.

2. The method of claim 1 where in step (c) hot pressing is carried out at a temperature of 525°–650° F.

3. A method of forming a cellulosic fiber containing board having a skin having a density of 40–55 pounds/ft.$^3$ on at least one of its surfaces comprising:
   (a) impregnating a consolidated cellulosic fiber containing mat with a solution of a skin forming chemical in an amount of 5–20% based on the dry weight of the mat material contacted therewith, wherein said skin forming chemical is selected from the group consisting of thiourea, dicyandiamide, ethanolamine, hexamethylenetetramine, and hydrazine plus formaldehyde; and
   (b) pressing said impregnated mat at a temperature of at least 525° F. to form said skin on the surface of said mat impregnated with said skin forming chemical.

4. The method of claim 1 wherein said skin forming chemical is an ammonia liberating chemical selected from the group consisting of ammonium thiocyanate, ammonium xylene sulfonate, mono-ammonium phosphate, di-ammonium phosphate and ammonium sulfate.

5. The method of claim 1 wherein said skin forming chemical comprises a sugar selected from the group consisting of sucrose, xylose, glucose, mannose, galactose, arabinose, and mixtures thereof.

6. The method of claim 1 wherein said skin forming chemical comprises linseed oil catalyzed with iron tallate.

7. The method of claim 1 wherein said skin forming chemical is a combination of boric acid and borax.

8. In a method of manufacturing a fiber-board, including the steps of hot-pressing a cellulosic fiber-containing mat to consolidate said mat into a unitary structure, the improvement comprising
   (a) impregnating at least one surface of said consolidated mat with a skin forming chemical in an amount of at least 5% based on the dry weight of the portion of the mat contacted with said chemical, and
   (b) hot-pressing said mat at a temperature of at least 525° F. for a period of time sufficient to form a fiber-board with a surface skin having a density of 40–55 pounds/ft.$^3$.

9. A method of forming a hard skin on the surface of a fiberboard, said skin having a density of 40–55 pounds/ft.$^3$ comprising:
   (a) contacting the surface fibers of a cellulosic fiber-containing mat with a skin forming chemcial selected from the group consisting of ammonium thiocyanate, thiourea, dicyanidiamide, hexamethylenetetramine, MASONEX, sucrose and mixtures thereof; and thereafter
   (b) hot-pressing said mat in a heated press at a temperature of at least 525° F. to form said fiberboard having a skin on said surface of said mat having a different composition than the composition of the material on which the skin is formed.

10. The method of claim 9 where in step (b) the temperature is 525°–650° F. and the pressure does not exceed 300 p.s.i.

11. A method of manufacturing a fiberboard having a skin on at least one surface thereof comprising:
   (a) depositing a first layer of fibers to form a base layer for supporting at least one surface skin thereon;
   (b) depositing a second layer of fibers over said first layer of fibers, said second layer of fibers including a skin forming chemical in an amount of at least 5% based on the total weight of said second layer of fibers, wherein said skin forming chemical is a urea derivative selected from the group consisting of guanamine, alkylureas, lower alkylthioureas, biuret, inorganic acid salts of urea, and mixtures thereof;
   (c) pressing said first and second layers in a heated press at a temperature less than 500° F. and at a pressure less than 700 p.s.i. to form a consolidated fiberboard having a density in the range of 10–65 pounds/ft.$^3$; and
   (d) hot-pressing said consolidated fiberboard at a temperature of 525°–650° F. to form at least one skin on said fiberboard said skin having a density of 40–55 pounds/ft.$^3$.

12. The method of claim 11 further including depositing a third layer of fibers in contact with said base layer between steps (b) and (c) to thereby sandwich said base layer between said second and third layers, said third layer of fibers including a skin forming chemical in an amount of at least five percent based on the total weight of said third layer of fibers where in said skin forming chemical included in said third layer is also selected from said group of urea-derivatives.

13. A fiberboard product comprising a base layer formed by the method of claim 8.

14. A method of manufacturing a cellulosic fiber-containing board having a skin on at least one surface thereof comprising:
   (a) depositing a water slurry of cellulosic fibers onto a water pervious support member to form a wet mat;
   (b) drying said wet mat to less than 8% water, based on the total weight of said mat, to consolidate said mat;
   (c) applying to at least one surface of said mat a solution of a skin forming chemical in at least the surface layer of fibers of said mat in an amount of 5–20% based on the dry weight of said surface layer wherein said skin forming chemical is an amine selected from the group consisting of thiourea, ethanolamine, hexamethylenetetramine, hydrazine plus formaldehyde and mixtures thereof;
   (d) hot-pressing said consolidated mat containing said skin forming chemical in at least its surface fibers, at a temperature of at least 525° F. to form a board having a skin having a density of 40–55 pounds/ft.$^3$ on at least one surface thereof, said skin being of different composition than the composition of the material on which the skin is formed.

15. A method of manufacturing a cellulosic fiber-containing board having a skin on at least one surface thereof comprising:
   (a) forming a consolidated cellulosic fiber-containing mat having a cured thermosetting resin binder;
   (b) applying to at least one surface of said mat a solution of a skin forming chemical in at least a surface layer of fibers of said mat in an amount of 5–20% based on the dry weight of said surface layers wherein said skin forming chemical is selected from the group consisting of ammonium thiocyanate, thiourea, acetamide, dicyandiamide, ethanolamine, hexamethylenetetramine, hydrazine+formaldehyde, ammonium xylene sulfonate, mono-ammonium phosphate, di-ammonium phosphate, ammonium sulfate, MASONEX, sucrose, boric acid+borax, linseed oil+iron tallate, and mixtures thereof; and
   (c) hot-pressing said consolidated mat containing said skin forming chemical and said cured thermosetting resin binder, at a temperature of at least 525° F. to form a skin having a density of 40–55 pounds/ft.$^3$ on at least one surface thereof.

16. The method of claim 15 wherein said skin forming chemical is applied to said mat prior to consolidation thereof.

17. The method of claim 15 wherein said skin forming chemical is applied to said mat after consolidation thereof.

18. A method of manufacturing a cellulosic fiber-containing board having a skin on at least one surface thereof comprising:
   (a) depositing a layer of fibers including cellulosic fibers onto a support member to form a loose mat;
   (b) consolidating said mat to bond said cellulosic fibers together to form a completed board;

(c) contacting at least one surface of said completed board with a skin forming chemical selected from the group consisting of ammonium thiocyanate, thiourea, acetamide, dicyanidamide, ethanolamine, hexamethylenetetramine, hydrazine+formaldehyde, ammonium xylene sulfonate, mono-ammonium phosphate, di-ammonium phosphate, ammonium sulfate, sucrose, boric acid, linseed oil-+iron tallate, and mixtures thereof in an amount sufficient to form a surface skin having a density of 40-55 pounds/ft.$^3$; and (d) hot-pressing said contacted surface at a temperature of at least 525° F. to form said skin on at least one surface thereof.

19. The method of claim 18 further including drying said board between steps (c) and (d).

20. A method of manufacturing a cellulosic fiber-containing board having a skin on at least one surface thereof comprising:

(a) depositing a layer of fibers including cellulosic fibers onto a support member to form a loose mat containing cellulosic fibers;

(b) contacting at least a surface of said mat with a skin forming chemical selected from the group consisting of ammonium thiocyanate, thiourea, acetamide, dicyandiamide, ethanolamine, hexamethylenetetramine, hydrazine+formaldehyde, ammonium xylene sulfonate, mono-ammonium phosphate, di-ammonium phosphate, ammonium sulfate, sucrose, boric acid, linseed oil+iron tallate, and mixtures thereof in an amount sufficient to form a skinned surface portion when said contacted surface is hot-pressed at a temperature of at least 525° F.;

(c) consolidating said skin forming chemical contacted mat to bond said cellulosic fibers together to form a completed board; and (d) hot-pressing said completed board at a temperature of at least 525° F. to form a skin on at least one surface thereof, said skin having a density of 40-55 pounds/ft.$^3$.

21. The method of claim 20 further including contacting a surface of the consolidated board with additional skin forming chemicals prior to step (d).

* * * * *